United States Patent [19]

Taii et al.

[11] Patent Number: 5,040,165
[45] Date of Patent: Aug. 13, 1991

[54] OPTICAL INFORMATION RECORDING MEDIUM AND METHOD OF FABRICATING THE SAME

[75] Inventors: Toshiaki Taii, Ibaraki; Hiroshi Nagate, Ikeda; Toyoyuki Nunomura, Toride, all of Japan

[73] Assignee: Hitachi Maxell, Ltd., Osaka, Japan

[21] Appl. No.: 318,167

[22] Filed: Mar. 2, 1989

[30] Foreign Application Priority Data

Mar. 3, 1988 [JP] Japan .................................. 63-48753

[51] Int. Cl.$^5$ .................................................. G11B 7/24
[52] U.S. Cl. ................................. 369/275.4; 369/116; 369/44.26; 369/44.37; 369/278
[58] Field of Search ............... 369/44.26, 44.31, 44.37, 369/54, 56, 116, 120, 277, 278, 279, 275.4, 275.1, 275.3

[56] References Cited

U.S. PATENT DOCUMENTS

| 4,118,734 | 10/1978 | Bauwhuis et al. | 369/111 |
| 4,744,074 | 5/1988 | Imanak et al. | 369/278 |
| 4,896,313 | 1/1990 | Hirose et al. | 369/275.4 |

FOREIGN PATENT DOCUMENTS 61-214149 9/1986 Japan .

OTHER PUBLICATIONS

"Technological Colligation for Optical Colligation", Science Forum K. K., Oct. 31, 1983; pp. 29-30 entitled "Synthetic Collection of Optical Memory and Opto-Magnetic Memory Technologies".

*Primary Examiner*—Roy N. Envall, Jr.
*Assistant Examiner*—Hindi Nabil
*Attorney, Agent, or Firm*—Birch, Stewart, Kolasch & Birch

[57] ABSTRACT

An optical information recording medium in which pre-pits longer than the diameter of a reproducing radiation spot and pre-pits shorter than the diameter of the reproducing radiation spot coexist, the width W of the pre-pit longer than the diameter of the reproducing radiation spot being formed with a value satisfying a relation of $\Phi/4 < W < \Phi/3$, wherein $\Phi$ is the diameter of the reproducing radiation spot and a method of fabricating the optical information recording medium comprising setting a power of a radiation beam when a pre-pit shorter than the diameter of the reproducing radiation spot among a plurality of pre-pits to be formed for each sector is cut to a predetermined optimum value, setting a power of the radiation beam when the pre-pit longer than the diameter of the reproducing radiation spot is cut to a predetermined value smaller than the predetermined optimum value of the radiation beam power when the pre-pit shorter than the diameter of the reproducing radiation spot is cut, and performing the cutting of pre-pits while combining the radiation beam power at the predetermined optimum value when the pre-pit shorter than the diameter of the reproducing radiation spot is cut with the radiation beam power at the predetermined smaller value when the pre-pit longer than the diameter of the reproducing radiation spot is cut.

18 Claims, 7 Drawing Sheets

OPTICAL INFORMATION RECORDING MEDIUM AND METHOD OF FABRICATING THE SAME

BACKGROUND OF THE INVENTION

1. Field of the Invention

The present invention relates to an optical information recording medium in which a pre-pit longer than the diameter of a reproducing radiation spot and a pre-pit shorter than the diameter of the reproducing radiation spot coexist in the same track, especially, the same sector, and also relates to a method of fabricating such an optical information recording medium.

2. Description of Related Art

There is known a write-once type or rewritable optical information recording medium in which a train of pre-pits and a pre-groove are predominantly formed in a recording region and a laser beam is used as a reproducing radiation spot. The train of pre-pits and pre-groove are formed with a concave/convex form in the surface of a substrate. A signal is optically read out by irradiating the substrate with the reproducing radiation spot having a diameter larger than the width of each of the pre-pits and pre-grooves to detect the intensity of light reflected from the substrate or light transmitted through the substrate by an optical detector. Namely, at a portion where the pre-pit is present, the intensity of light incident upon the optical detector decreases since the interference and diffraction of light are produced between light with which the pre-pit itself is irradiated and light with which a land portion having no pre-pit and pre-groove formed thereon is irradiated. On the other hand, at a portion where no pre-pit is present, the intensity of light incident upon the optical detector increases since such a phenomenon of interference and diffraction of light is not produced. Accordingly, a pre-pit signal can be read on the basis of the waveform of an output signal of the optical detector.

In order to facilitate the reading of a signal, it is preferable that the level of a production signal or a difference in intensity of light upon the optical detector between the portion including the pre-pit and the portion including no pre-pit is large.

The intensity of light incident upon the optical detector from the portion including the pre-pit depends on the size of the pre-pit. Provided that the refractive index of the substrate is $n_1$, the refractive index of the air is $n_2$, the wavelength of the reproducing radiation is $\lambda$ and the diameter of the reproducing radiation spot is $\phi$, the intensity of light incident upon the optical detector in the case of a reflection type of optical information recording medium becomes the minimum to allow correct detection of the pre-pit when the depth (or height) d of the pre-pit is equal to $N \cdot \lambda / 4n_1$ (N: is a positive odd number) and the width of the pre-pit is equal to $\phi/3$. In the case of a transmission type of optical information recording medium, the intensity of reflected light incident upon the optical detector becomes minimum when the depth (or height) d of the pre-pit is equal to $N \cdot \lambda / 4(n_1 - n_2)$ and the width of the pre-pit is equal to $\phi/3$. See pages 29 and 30 of "SYNTHETIC COLLECTION OF OPTICAL MEMORY AND OPTO-MAGNETIC MEMORY TECHNOLOGIES" published on Oct. 31, 1983 by Science Foram Co., Ltd.

The above-mentioned type of optical information recording medium is fabricated in such a manner that a prototype or master having a photoresist layer formed thereon is irradiated with a signal-modulated cutting light to cut or form grooves serving as the origins of the above-mentioned pre-pits and pregrooves, and an inverse pattern of the cut grooves is transferred from the prototype to a substrate.

The width of the groove (pre-pit) cut in the photoresist layer is proportional to the product of the intensity of the cutting light and the irradiation time thereof. Accordingly, when a longer pre-pit and a shorter pre-pit are cut by use of cutting light, the intensity of which is fixed, the width of the longer pre-pit with a longer pit length requiring a longer irradiation time of the cutting light becomes large while the width of the shorter pre-pit becomes small. Therefore, if the width of either one of the longer pre-pit and the shorter pre-pit is selected to have the above-mentioned optimum value, the width of the other pre-pit will take an undesirable value deviated from the optimum value, thereby affecting correct recording or reproduction of information. Especially, when the intensity of the cutting light is set such that the width of the longer pre-pit takes the optimum value, the level of a reproduction output from the shorter pre-pit cut by the cutting light having such an intensity becomes remarkably low and hence it is not possible to cope with a demand for improvement of a recording density by shortening each of the longer pre-pit and the shorter pre-pit.

In order to eliminate the above-mentioned inconvenience, the assignee of the present application has proposed an optical information recording disk characterized in that the width of a pit shorter than the diameter of a reproducing laser spot is made larger than that of a pit longer than the diameter of the reproducing laser spot (JP-A-61-214149). The assignee of the present application has also proposed a method of fabricating such an optical information recording disk. In the proposed method, a prototype or master optical disk is driven to rotate at a constant angular velocity. In an outer region of the prototype optical disk where the pit length of the smallest or shortest pit is longer than the diameter of the reproducing laser spot, a photosensitive surface of the prototype optical disk is exposed with an exposure intensity which is proportional to a distance from the center of rotation of the prototype optical disk to the center of a cutting laser spot located at the outer region of the prototype optical disk. On the other hand, in an inner region of the prototype optical disk where the pit length of the smallest or shortest pit is shorter than the diameter of the reproducing laser spot, the photosensitive surface of the prototype optical disk is exposed with the amount of exposure which is equal to the amount of exposure for pits in the region where the pit length is longer than the diameter of the reproducing laser spot. According to this method, the pre-pit having a shorter pit length is formed with a wider width and hence the level of a reproduction output signal is prevented from being lowered or deteriorated. Therefore, the signal length of a recording signal (or the pit length corresponding to the recording signal) can be shortened. As a result, it is possible to make the recording density high, to make the recording capacity large and to make the size of an optical information recording disk small.

The above-mentioned optimum value for pre-pit width is substantially true for an in-groove recording type of optical information recording medium or an optical information recording medium which has no pre-groove and in which a track pitch is adjusted such that a reproducing radiation spot does not extend to or reach a track adjacent to a track from which a signal is to be reproduced.

However, especially, in an optical information recording medium such as an on-land recording type of optical information recording medium or an optical information recording medium having a relatively narrow track pitch in which the peripheral portion of a reproducing radiation spot extends to or cover a track adjacent to a track from which a signal is to be reproduced, if the width W of a pre-pit is selected to take the above-mentioned optimum value, the amount of light impinging upon a land portion is decreased by a portion of the reproducing radiation spot extending to and covering the adjacent track, thereby reducing the effect of interference of light to increase the intensity of light incident upon an optical detector. As a result, the level of a production output from a pre-pit shorter than the diameter of the reproducing radiation spot is deteriorated while a pre-pit longer than the diameter of the reproducing radiation spot yields a reproduction signal waveform 41 which involves a distortion 42, as shown in FIG. 1. The distortion component 42 is produced because the amount of light reflected from the side wall portions of the pre-pit longer than the diameter of the reproducing radiation spot is increased when the reproducing radiation spot lies in a central portion and does not cover the front and rear portions of the pre-pit in a longitudinal direction thereof. If a signal distortion component indicated by dotted line 42 in FIG. 1 is superimposed on a normal detection waveform indicated by solid line 41, there is a possibility that the processing of the reproduction signal erroneously detects a waveform, as indicated by one-dotted chain line in FIG. 1, which has a level L lower than the correct or normal detection level.

Pre-pits having longer pit lengths and pre-pits having shorter pit lengths coexist in the pre-pit train, as has been mentioned above. In the case when the width of the pre-pit longer than the diameter of the reproducing radiation spot is formed with the above-mentioned optimum value, there is a problem that the flow of a resin upon injection shaping of a substrate is arrested, thereby deteriorating the transferability of pre-pits.

In order to eliminate such inconveniences, there has been proposed an optical information recording medium in which the front end portion 43a and rear end portion 43b of each pre-pit 43 are tapered, as shown in FIG. 2. When the pre-pit 43 is formed as shown in FIG. 2, any distortion of the waveform can be effectively eliminated but the level L of a reproduction signal is deteriorated, as shown by one-dotted chain line in FIG. 1, so that an error is liable to be generated upon reading of a signal.

The above-mentioned method of fabrication of an optical information recording disk which has been proposed by the assignee of the present application has a drawback, as will be explained just below, in the case where a recording region configured into a ring shape is partitioned in its circumferential direction into a multiplicity of sectors and a sector mark pit representative of the partition for each sector and ID pits inclusive of address pits and synchronizing pits are preliminarily formed for each sector.

Namely, the sector mark pit is elongated as compared with the ID pit in order to discriminate them from each other. For example, when each of the time length of an address signal and the period of a synchronizing signal read from an optical information recording disk rotationally driven at 1,800 r.p.m. is 90 ns, the sector mark is formed with a length of 540 ns or 900 ns. In the case where each pre-pit is formed with such a length, the sector mark becomes longer than the diameter of the reproducing radiation spot even in a region where the ID pit is shorter than the diameter of the reproducing radiation spot, or pits shorter than the diameter of the reproducing radiation spot and pits longer than the diameter of the reproducing radiation spot coexist in the same sector of the same track.

If the above-mentioned conventional method is applied to such a pattern of pre-pits, that is, if all of the pre-pits included in the same track are exposed with the same power, the sector mark portion having a longer length is subjected to excessive exposure since the size or width of a pre-pit formed is proportional to the product of the power of a cutting radiation beam and the irradiation time thereof, as has already been mentioned. As a result, the width of the sector mark becomes wider as compared with that of the ID pit.

Though in the foregoing explanation the sector mark and the ID pit have been exemplified as a pit longer than the diameter of the reproducing radiation spot and a pit shorter than the diameter of the reproducing radiation spot, respectively, the above-mentioned problem may arise irrespective of the kind of pre-pits in any case where a pit longer than the diameter of the reproducing radiation spot and a pit shorter than the diameter of the radiation spot coexist.

SUMMARY OF THE INVENTION

A first object of the present invention is to provide an optical information recording medium in which the level of the reproduction output is not deteriorated and distortion is not produced in a reproduction signal waveform even if the peripheral portion of a reproducing radiation spot extends to a track adjacent to a track from which a signal is to be reproduced.

A second object of the present invention is to provide a method by which such an optical information recording medium can be fabricated.

To achieve the first object of the present invention directed to an optical information recording medium in which a pre-pit longer than the diameter of a reproducing radiation spot and a pre-pit shorter than the diameter of the reproducing radiation spot coexist in a recording region, the width W of the pre-pit longer than the diameter of the reproducing radiation spot satisfies a relation of $\phi/4 < W < \phi/3$, wherein $\phi$ is the diameter of the reproducing radiation spot.

To achieve the second object, a train of pre-pits are cut in a master or prototype in such a manner that a pre-pit shorter than the diameter of a reproducing radiation spot is cut with a radiation power adjusted so that the width of the pre-pit assumes a predetermined optimum value, while a pre-pit longer than the diameter of the reproducing radiation spot is cut with a radiation power smaller than the radiation power with which the pre-pit shorter than the diameter of the reproducing radiation spot is cut.

DESCRIPTION OF THE PREFERRED EMBODIMENTS

Embodiments of the present invention will now be explained by virtue of the accompanying drawings.

Figure 3:
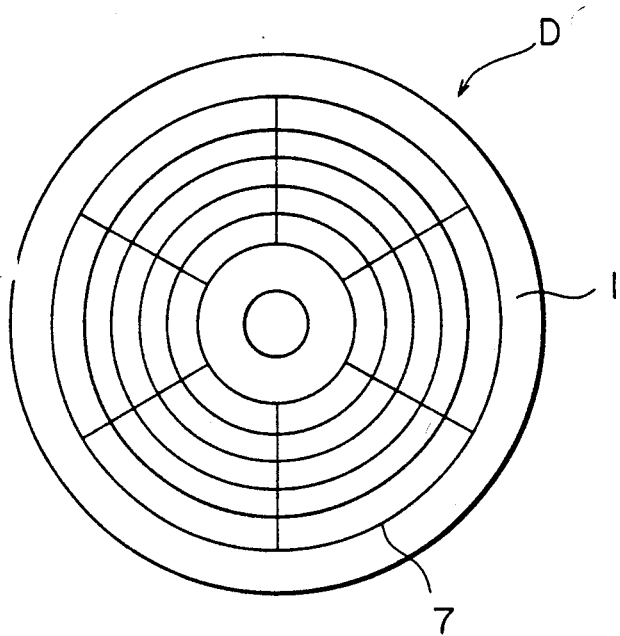
FIG. 3 is a schematic view showing an embodiment in which the present invention is applied to an optical disk having concentrical circular pregrooves formed therein.
Figure 4:
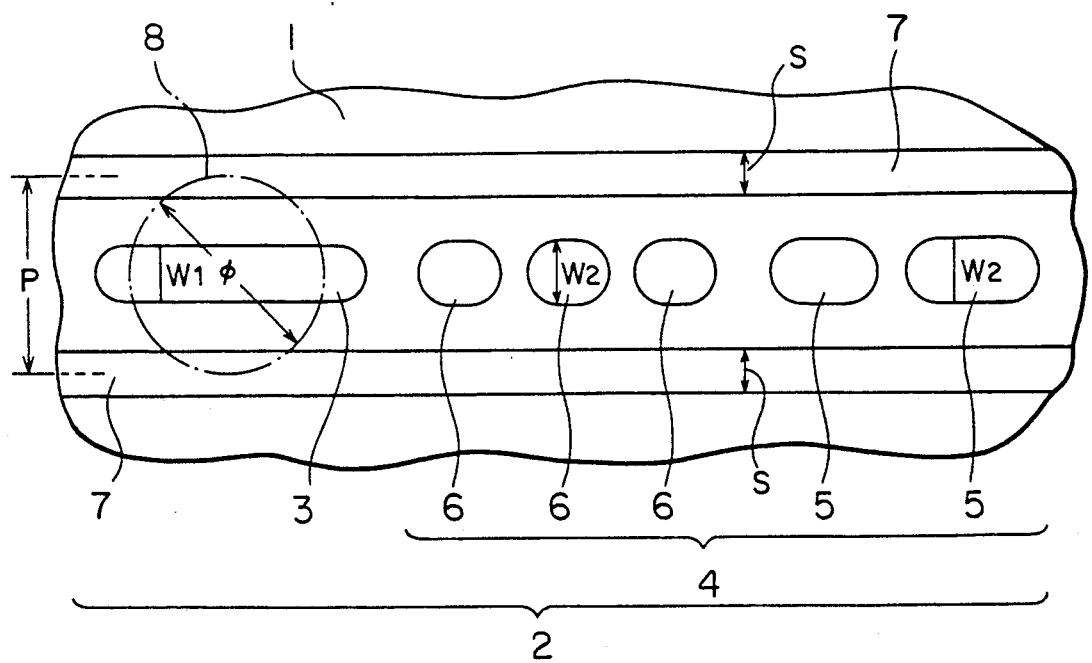
FIG. 4 is an enlarged view of a sector head portion of the optical disk shown in FIG. 3.

FIG. 3 shows the case where an optical information recording medium according to an embodiment of the present invention is applied to an on-land recording type of optical disk D in which concentrical circular pre-grooves 7 are formed. FIG. 4 shows an enlarged view of a sector head portion of the optical disk D exemplified in FIG. 3.

In FIGS. 3 and 4, a substrate 1 has formed thereon a train of pre-pits 2, a sector mark pit 3, a train of ID (identification) pits 4, including an address pit 5, a synchronizing pit 6, a pre-groove 7, and a reproducing radiation spot 8.

As shown in FIG. 4, in the optical information recording medium according to the present embodiment, the length of the sector mark pit 3 is made longer than the diameter $\phi$ of the reproducing radiation spot 8 and the length of each of the address pits 5 and synchronizing pits 6 included in the ID pit train 4 is made shorter than the diameter $\phi$ of the reproducing radiation spot 8. The pre-groove 7 is formed with a width S which is substantially equal to the width of each of the pre-pits 3, 5 and 6, and an interval, between the pre-grooves 7 or a track pitch P is set such that the peripheral portion of the reproducing radiation spot 8 covers a range which is $\frac{1}{2}$ to 1 times as large as the width S of the pregroove 7.

When the diameter of the reproducing radiation spot 8 is $\phi$, the sector mark pit 3 is formed with a width $W_1$ which satisfies a relation of $\phi/4 < W_1 < \phi/3$. Provided that the refractive index of the substrate is $n_1$, the refractive index of the air is $n_2$, the wavelength of the reproducing radiation is $\lambda$ and the diameter of the reproducing radiation spot is $\phi$, the depth (or height) d of the sector mark pit 3 is formed with a value equal to $N \cdot \lambda / 4 n_1$ (N: a positive odd number) in the case of a reflection type of optical information recording medium and with a value equal to $N \cdot \lambda / 4(n_1 - n_2)$ in the case of a transmission type of optical information recording medium.

On the other hand, the width $W_2$ of each of the address pits 5 and the synchronizing pits 6 included in the ID pit train 4 is formed with a value equal to $\phi/3$. The depth (or height) of each of the address pits 5 and the synchronizing pits 6 is formed with a value similar to that of the sector mark pit 3.

The depth (or height) of the pre-groove 7 is formed with a value equal to or shallower (or lower) than that of the pre-pit 3, 5 or 6.

Figure 5:
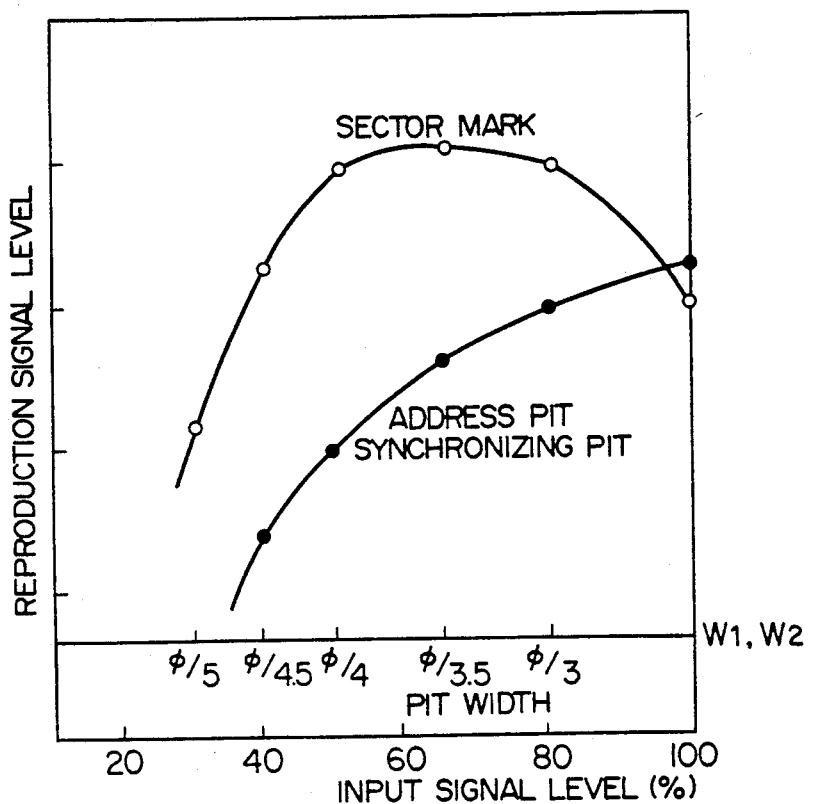
FIG. 5 is a characteristic view showing a relation between a reproduction signal level, an input signal level and a pit width.

The present inventors have prepared various disks in which the width $W_1$ of the sector mark pit 3 longer than the diameter $\phi$ of the reproducing radiation spot and the width $W_2$ of the ID pit such as the address pit or synchronizing pit are changed by changing the level of an input signal for cutting upon fabrication of a master, prototype or original disk. The level of a reproduction signal from each of the prepared optical disks which were prepared by using molds made from the original disks, has been measured. The qualitative results obtained by such experiments are shown in FIG. 5. As apparent from FIG. 5, it has been confirmed that the reproduction signal level has the highest value when the width $W_1$ of the sector mark pit 3 falls within a range satisfying a relation of $\phi/4 < W_1 < \phi/3$ but it is rapidly deteriorated when the value of $W_1$ lies beyond or below that range. Thus, it is preferable that the width $W_1$ of the sector mark pit 3 longer than the diameter $\phi$ of the reproducing radiation spot falls within the range of $\phi/4 < W_1 < \phi/3$. Why a high reproduction signal level is obtained may be because by adjusting the width of the sector mark pit to fall within such a range, the deterioration of interference of light due to the fact that the peripheral portion of the reproducing radiation spot 8 extends to the pre-groove can be compensated, thereby keeping the reproduction signal level at a high level.

Figure 6:
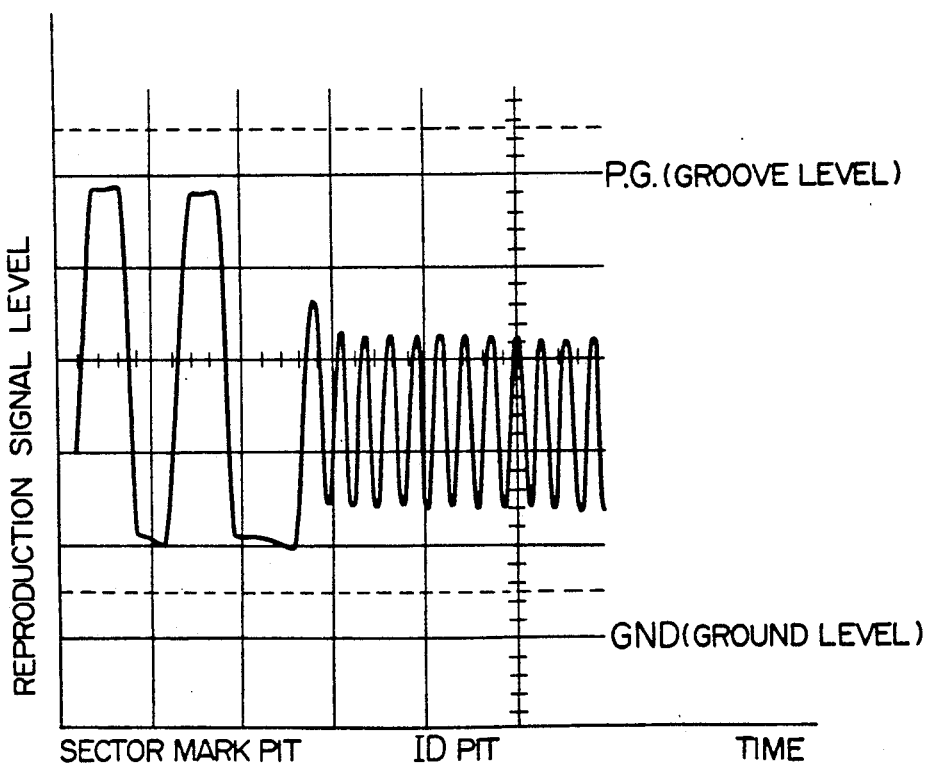
FIG. 6 is a view showing an example of a reproduction signal obtained from the optical disk in the embodiment shown in FIG. 3.

For a similar reason, a reproduction signal free of any distortion can be obtained, as shown in FIG. 6. Accordingly, the detection of the sector mark can be reliably made, thereby reducing an access error.

Since the sector mark pit 3, with pre-grooves at both sides thereof, longer than the diameter $\phi$ of the reproducing radiation spot, is thus formed with a width from $\phi/3$ to $\phi/4 \sim \phi/3$, the flow of resin upon injection shaping of the substrate becomes good, thereby improving the transferability of the pre-pits and pre-grooves.

Figure 1:
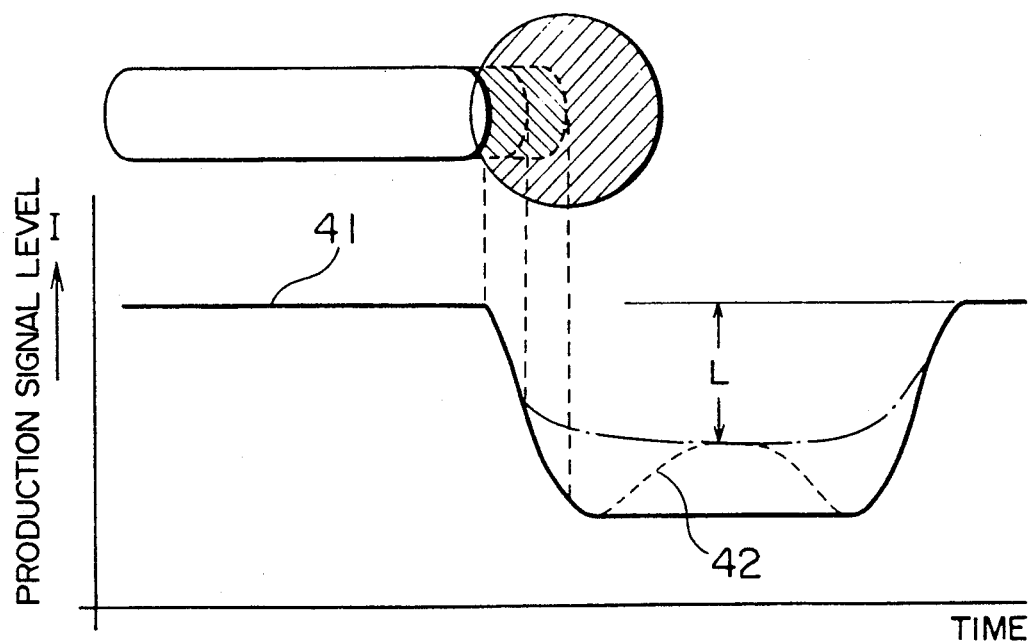
FIG. 1 shows the conventional pre-pit longer than the diameter of a reproducing radiation beam spot and the waveform of a signal reproduced therefrom.
Figure 2:
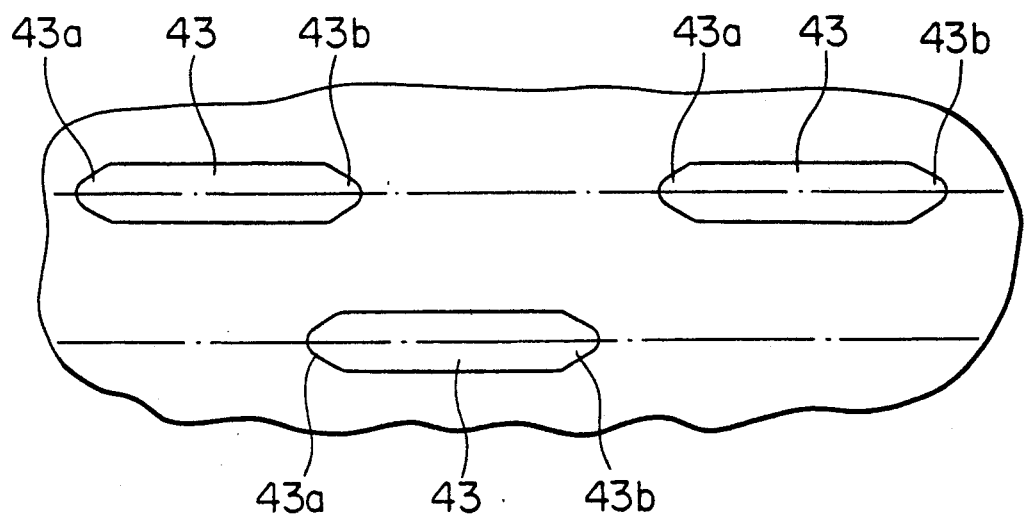
FIG. 2 is a plan view showing an example of the form of the conventional pre-pit.

Also, the ID pit 4 shorter than the diameter of the reproducing radiation spot is formed with a width $W_2$ equal to $\phi/3$. Therefore, even if the peripheral portion of the reproducing radiation spot 8 rests on or extends to the pre-groove, influence which the diffraction of light by the pre-groove has on the intensity of a pulse produced from the pre-pit is small. This seems because the decrease of the light intensity caused by the diffraction of light at the pre-grooves is compensated for by narrowing the width of the sector mark pits to maintain the reproduction signal at a high level, thereby producing the reproduction signal with no distortion as shown in FIG. 2. Accordingly, the reproduction signal level can be held at a high level and no distortion is produced in the reproduction signal waveform.

In the foregoing embodiment, an explanation has been made of the case where the sector mark pit 3 is made longer than the diameter $\phi$ of the reproducing radiation spot 8 and each of the address pit 5 and the synchronizing pit 6 is made shorter than the diameter $\phi$ of the reproducing radiation spot 8. However, when the address pit 5 and the synchronizing pit 6 are made longer than the diameter $\phi$ of the reproducing radiation spot 8, the width W of each of the pre-pits should be formed with a value which falls in a range satisfying a relation of $\phi/4 < W < \phi/3$.

Figure 7:
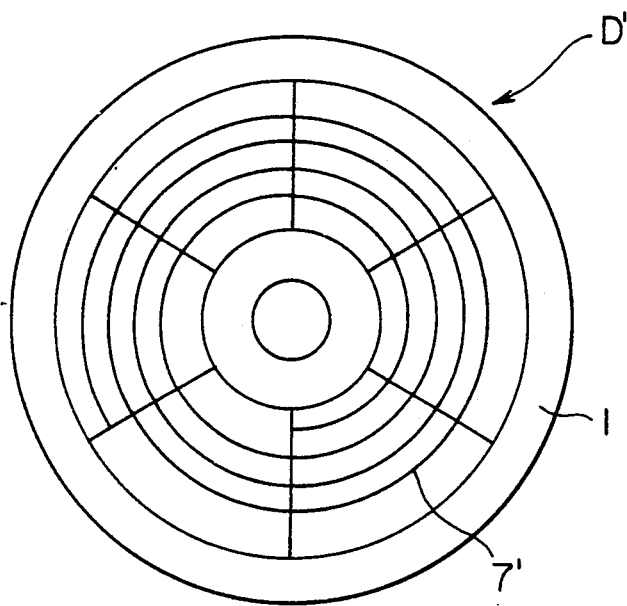
FIG. 7 is a schematic view of an embodiment in which the present invention is applied to an optical disk having a spiral pre-groove.

The embodiment shown in FIGS. 3 and 4 concerns the on-land recording type of optical disk D in which the concentrical pre-grooves 7 are formed. However, the present invention is also applicable to an on-land recording type of optical disk D' in which a spiral pre-groove 7' is formed as shown in FIG. 7 and is further applicable to an in-groove recording system in which various pits 3, 5 and 6 are formed in a pre-groove 7 in an overlaid relation therewith, as shown by an enlarged view of FIG. 8.

Figure 8:
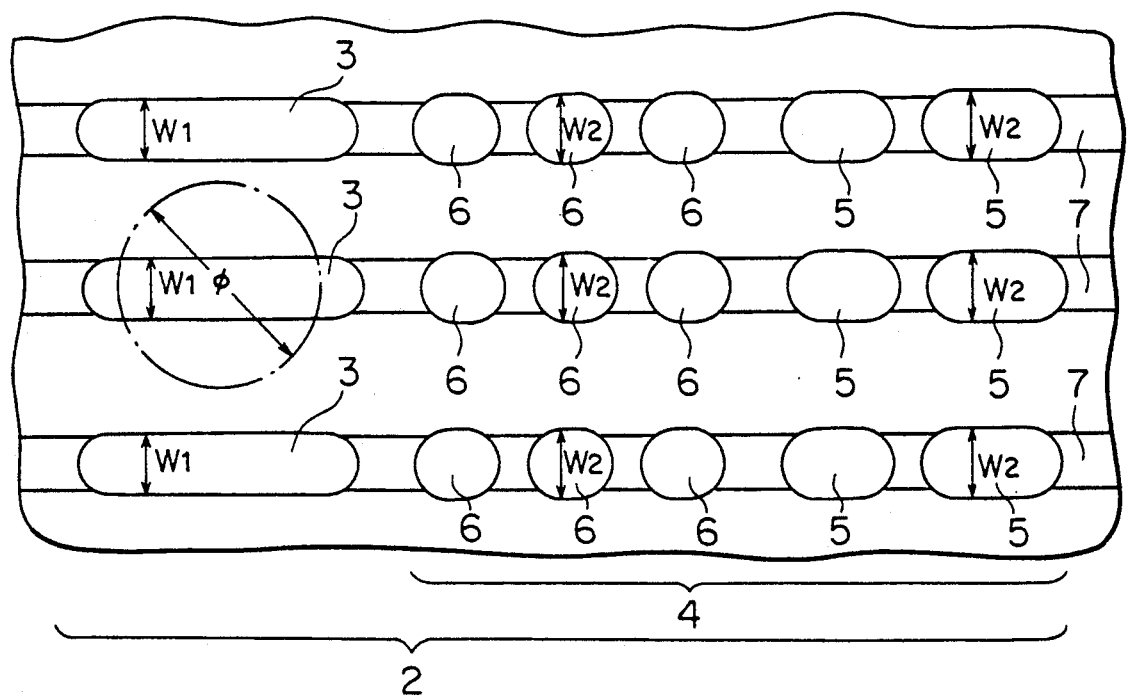
FIG. 8 is an enlarged view of a sector head portion in an embodiment in which the present invention is applied to an in-groove recording type of optical disk.
Figure 9:
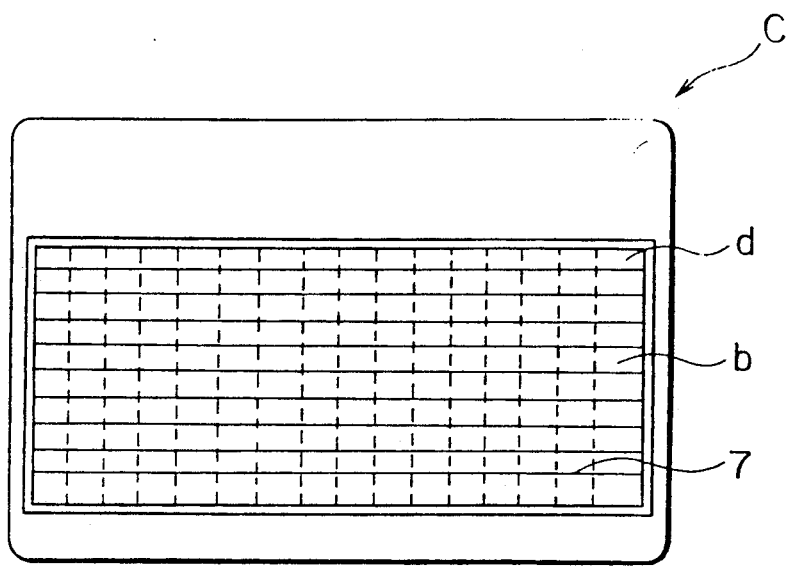
FIG. 9 is a schematic view showing an embodiment in which the present invention is applied to an optical card.

The optical information recording medium according to the present invention is not limited to the above-mentioned and shown configurations or shapes of the optical disk. It is applicable to an optical card C as shown in FIG. 9. In the application to the optical card C, pre-grooves 7 are disposed parallel to a side or longitudinal direction of the optical card C to define bands b of data regions d. A method of writing data in the data region d may be an on-land system, as shown in FIG. 4, or an in-groove system, as shown in FIG. 8.

In summary, an effect of the present invention can be obtained irrespective of the kind of pre-pit or optical recording medium so long as the width $W_1$ of a pre-pit formed in any portion of a recording region and having a pit length longer than the diameter $\phi$ of a reproducing radiation spot satisfies a relation of $\phi/4 < W_1 < \phi/3$.

Next, an explanation will be made of a master or prototype optical disk cutting apparatus which is used in embodying the present invention and a method by which an optical disk according to the present invention is fabricated.

Figure 10:
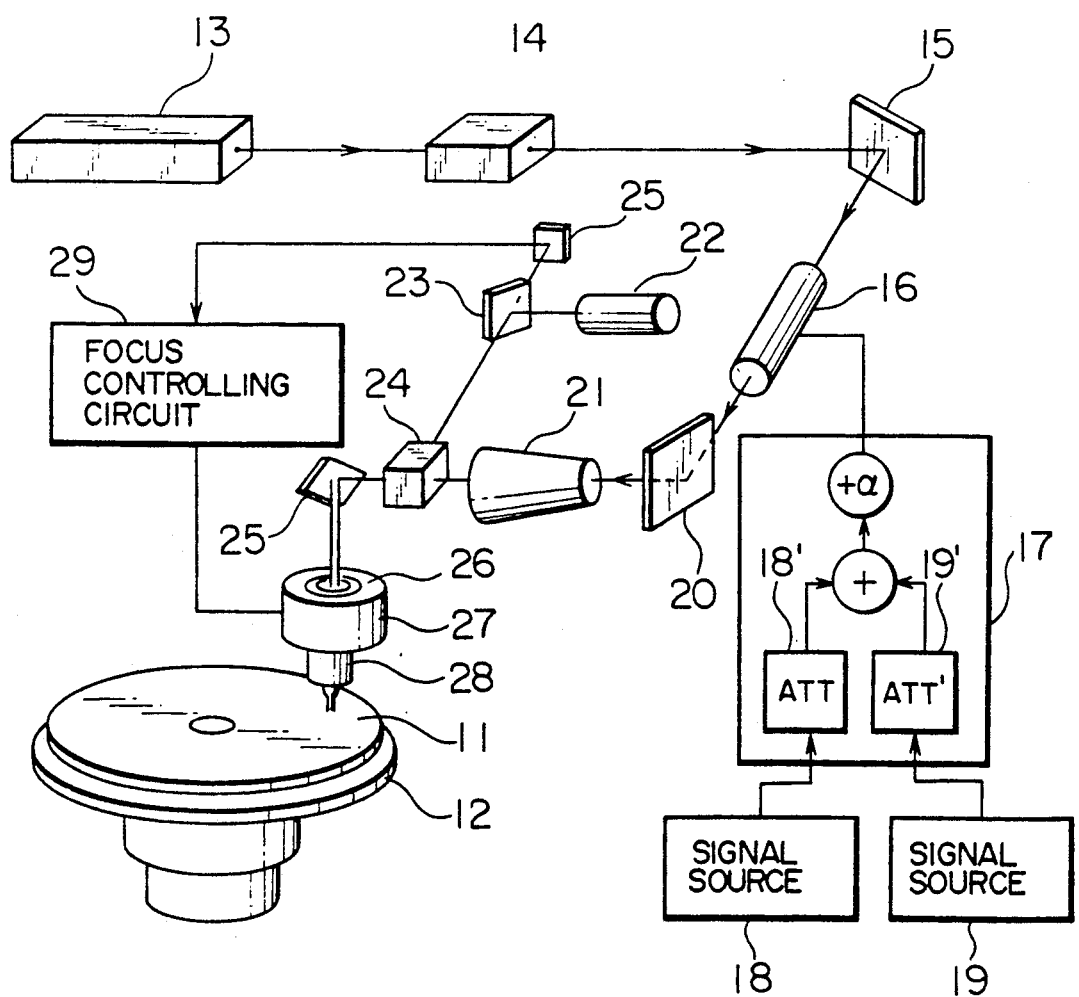
FIG. 10 is a schematic view showing an apparatus used in a method of fabricating an in-groove recording type of optical disk.

FIG. 10 shows a cutting apparatus used in fabricating an in-groove recording type of optical disk. In FIG. 10, there is seen a master or prototype optical disk 11, a turn table 12, an argon (Ar) laser 13, a first optical modulator 14, a reflecting mirror 15, a second optical modulator 16, a formatter driver 17 connected to the second optical modulator 16, sources of signals 18 and 19 applied to the formatter driver 17, a reflecting mirror 20, a beam expander 21, a helium-neon (He-Ne) laser 22, a half mirror 23, a beam mixing prism 24, a reflecting mirror 25, a cutting head 26, a focus actuator 27 provided in the cutting head 26, an objective lens 28 provided in the cutting head 26, and a focus controlling circuit 29 for the cutting head 26.

The Ar laser 13 is used for exposing a photosensitive surface of the prototype optical disk 11 to a laser beam emitted from the Ar laser 13. The He-Ne laser 22 has a wavelength outside of a range in which the photosensitive surface of the prototype optical disk 11 is sensible.

The He-Ne laser 22 is used for automatic focus adjustment of the focus actuator 27 provided in the cutting head 26.

Each of the optical modulators 14 and 16 may be an acousto-optical modulator, an electro-optical modulator or any combination thereof. In the acousto-optical modulator, an alternate voltage is applied to a piezo-electric body made of, for example, $LiNbO_3$, to generate an ultrasonic wave (or sparsity and density wave) in a medium attached to the piezo-electric body and made of, for example, $TeO_2$ or $PbMoO_4$, so that the ultrasonic wave generated serves as a diffraction grating for diffracting a signal wave. The ultrasonic wave generating or exciting voltage is amplitude-modulated to obtain a modulating light having a predetermined power. On the other hand, in the electro-optical modulator, there is utilized a phenomenon whereby a voltage is applied to a Pockels cell to produce an anisotropy between the main axis of a refractive index ellipsoid of the crystal so that a difference in phase velocity proportional to the intensity of an electric field is produced between two linearly polarized waves propagating through the crystal. An elliptically polarized light emanating from the Pockels cell is taken out through an analyzer to obtain an amplitude-modulated output light.

Accordingly, the amount of exposure for the photosensitive surface formed on the prototype optical disk 11 can be properly adjusted by adjusting the values of voltages applied to the optical modulators 14 and 16.

The first optical modulator 14 is provided for adjustment of the power of a laser beam incident upon the second optical modulator 16 and for noise reduction. The second optical modulator 16 is provided for signal-modulating a laser beam incident thereon from the first optical modulator 14.

The signal source 18 is provided for supplying data corresponding to the ID pit to the formatter driver 17 and the signal source 19 is provided for supplying data corresponding to the sector mark to the formatter driver 17. The formatter driver 17 inputs a signal of the optimum level to the second optical modulator in accordance with signals from the signal sources 18 and 19.

Figure 11:
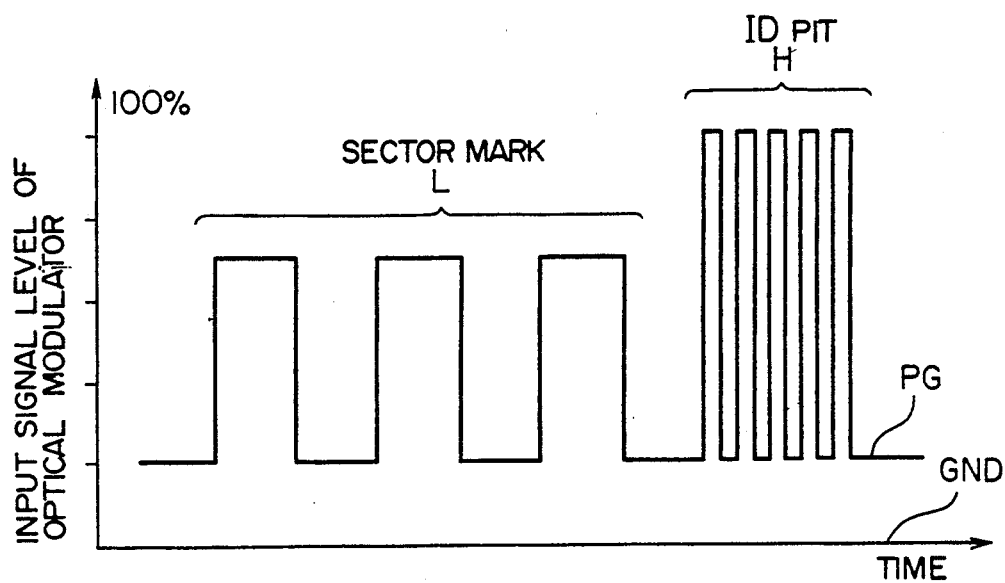
FIG. 11 is a characteristic view for signals which are used upon cutting of the optical disk in the apparatus of FIG. 10 to form pre-pits for a sector head portion of the optical disk.

As shown in FIG. 5, an interrelation exists between the level of an input signal to the second optical modulator 16, the width of a pre-pit formed therewith and the level of a reproduction signal read from the pre-pit. As for the address pit or synchronizing pit shorter than the diameter $\phi$ of a reproducing radiation spot, when the signal level inputted to the second optical modulator 16 is 100%, a pit wider than the theoretically optimum value $\phi/3$ is formed and the reproduction signal takes the maximum level. On the other hand, as for the sector mark longer than the diameter of the reproducing radiation spot, when the signal level inputted to the second optical modulator 16 is 50 to 80%, a pit narrower than the theoretically optimum value $\phi/3$ or having a width $W_1$ in a range of $\phi/4 < W_1 < \phi/3$ is formed and the reproduction signal takes the maximum level. Accordingly, as shown in FIG. 11, the formatter driver 17 delivers a signal H of a high level for an ID signal to make the modulation efficiency of the second optical modulator 16 maximum and a signal L of a low level for a sector mark signal so that the modulation efficiency assumes 50 to 80%. Symbol PG shown in FIG. 11 represents a signal for cutting a pre-groove. The formatter driver 17 includes a signal block (indicated by $+\alpha$ in FIG. 10) for generating a signal with which the modulation efficiency of the second optical modulator 16 assumes 20 to 35% for the pre-groove cutting signal when no signal is inputted from the signal sources 18 and 19. Thus, the formatter driver 17 is constructed to continually output the pre-groove cutting signal which causes the second optical modulator 16 to take the modulation efficiency of 20 to 35%. The formatter driver 17 further includes attenuators 18' and 19' connected to the signal sources 18 and 19 for producing the above-mentioned high and low level signals H and L. The data signal from the signal source 18 corresponding to the ID pit is adjusted by the attenuator 18' so as to provide the high level signal H with which the modulation efficiency of the second optical modulator 16 has the modulation efficiency of 100%. The data signal from the signal source 19 corresponding to the sector mark is adjusted by the attenuator 19' so as to provide the low level signal L with which the second optical modulator 16 has the modulation efficiency of 50 to 80%.

The level-adjusted signals are composed with each other in a timed relation, as shown in FIG. 11, and are applied to the second optical modulator 16.

Figure 12:
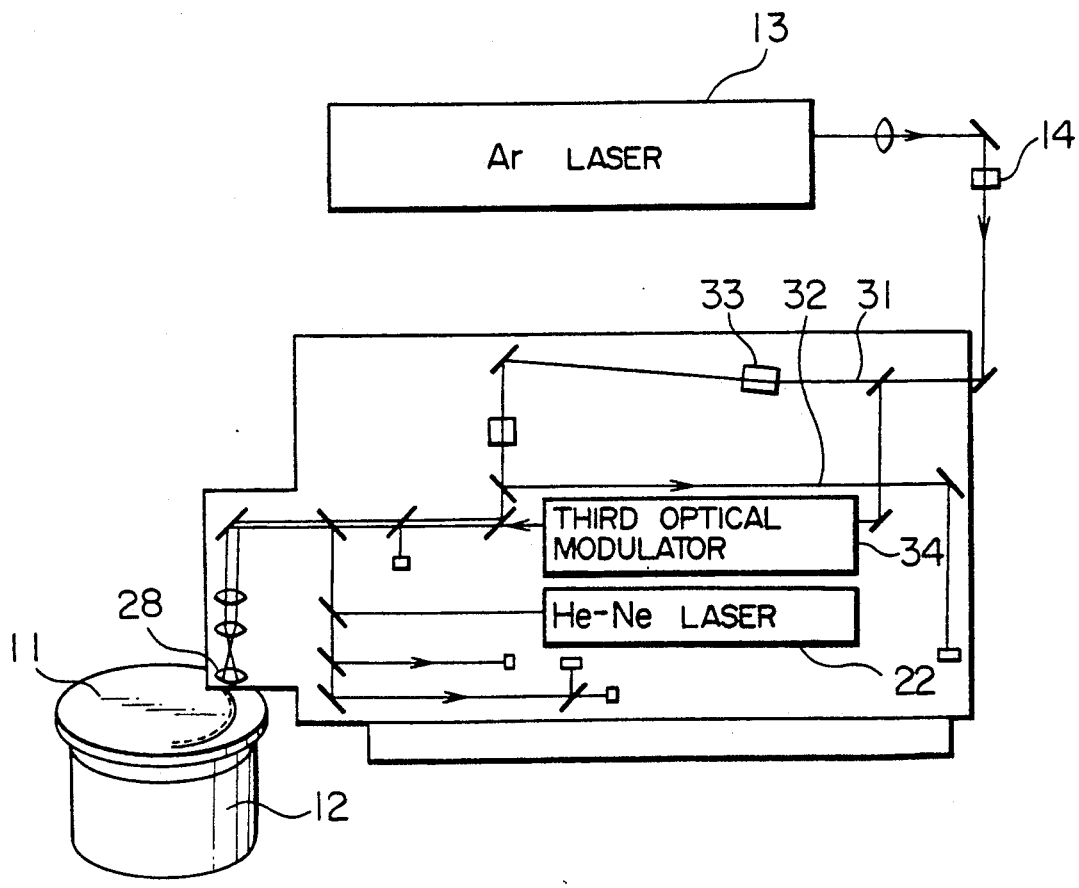
FIG. 12 is a schematic view showing an apparatus used in a method of fabricating an on-land recording type of optical disk.

FIG. 12 shows a master or prototype optical disk cutting apparatus used in fabricating an on-land recording type of optical information recording medium. Referring to FIG. 12, an optical path extending from a first optical modulator 14 to an objective lens 28 is split into two parts 31 and 32. Second and third optical modulators 33 and 34 are disposed in the optical paths 31 and 32 respectively so that two independent beam spots are directed from the objective lens 28 onto the prototype optical disk 11 at a predetermined interval in a radius direction of the prototype optical disk 11. One of the two independent beam spots effects the cutting of a pre-groove and at the same time the other thereof effects the cutting of a sector mark and ID pits which form a sector head portion.

Figure 13:
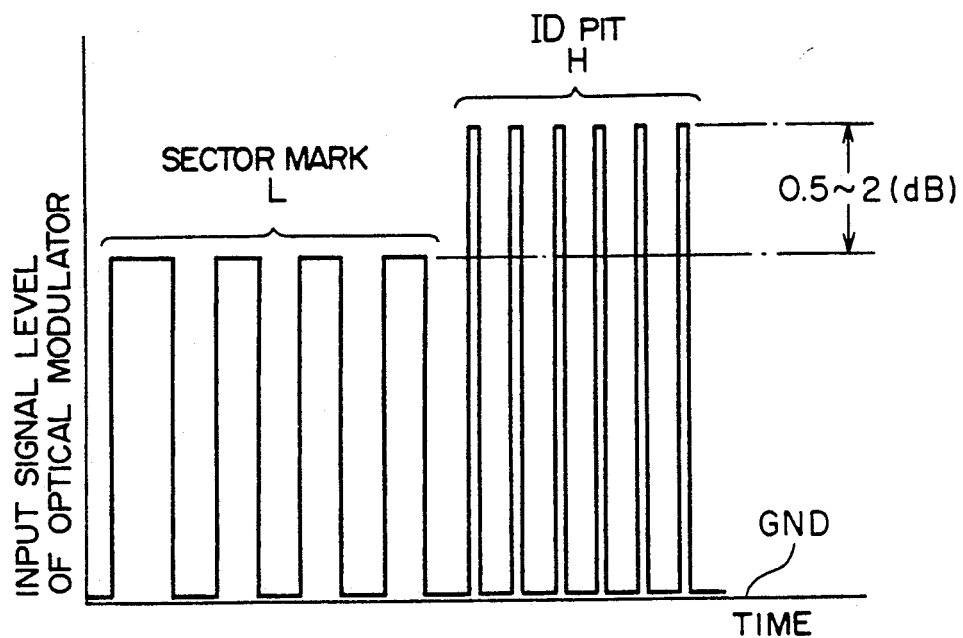
FIG. 13 is a characteristic view for signals which are used upon cutting of the optical disk in the apparatus of FIG. 12 to form pre-pits for a sector head portion of the optical disk.

Signal sources (not shown) for supplying a sector signal and an ID signal are connected to the second optical modulator 33 through a formatter driver (not shown) which adjusts the levels of those signals and the timing of composition thereof. Means for adjusting each of the sector mark signal and the ID signal and the amplitude of the signal after adjustment are similar to those explained in conjunction with the apparatus shown in FIG. 10 and a signal, as shown in FIG. 13, is applied to the second optical modulator 33. The third optical modulator 34 is connected to a signal source (not shown) which outputs a pre-groove signal having a constant level.

Components shown in FIG. 12 other than the above-mentioned components and indicated by the same reference numerals as those shown in FIG. 10 have functions similar to the corresponding components of FIG. 10 and hence any further explanation thereof is not considered necessary.

When a prototype optical disk is to be cut by means of the cutting apparatus shown in FIG. 10 or 12, the turn table 12 is rotationally driven to rotate the master optical disk 11 subjected to no recording at a constant angular velocity while the cutting head 26 is moved at a constant speed from the inner periphery of the prototype optical disk 11 toward the outer periphery thereof so that the photosensitive surface of the prototype optical disk 11 is exposed to a laser beam(s) from the objective lens 28 signal-modulated by the signal shown in FIG. 11 or 13. In the case of the apparatus shown in FIG. 10, a streak of concave/convex pattern involving the superimposed sector mark, ID and tracking signals is spirally cut. In the case of the apparatus shown in FIG. 12, a pre-pit train involving the superimposed sector mark and ID signals and a pre-groove corresponding to the tracking signal are cut in a double-spiral form, thereby providing an on-land recording type of prototype optical disk in which a train of pre-pits is disposed between two streaks of pre-grooves.

Figure 14:
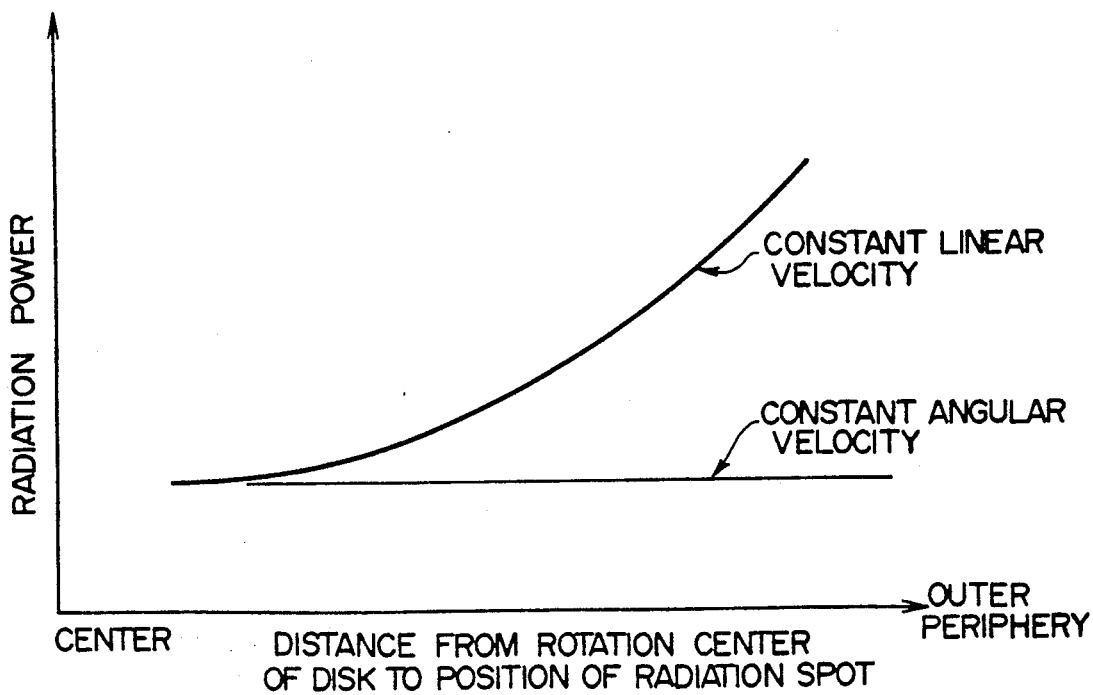
FIG. 14 is a characteristic view showing a relation between a radiation power and a distance from the center of rotation of an optical disk to the position of a laser beam spot with which the optical disk is irradiated.

In performing the cutting of the prototype optical disk, the block or optical modulator 14 in FIG. 10 or 12 is controlled so that the laser power for cutting the sector mark pit and the ID pit is successively increased with the increase of a distance from the center of rotation of the prototype optical disk to the radiation center of the laser spot,,as shown in FIG. 14, thereby keeping constant the intensity of the laser beam per unit area of the photosensitive surface irradiated with the laser spot.

An optical information recording disk is formed by preparing a metal pattern (called a stamper) through a transfer process on the basis of the prototype optical disk having the train of pre-pits formed therein as mentioned above, duplicating from the stamper a substrate having a train of pre-pits transferred from the stamper, and disposing a thin film, such as a recording film, onto a signal surface of the substrate.

If the prototype optical disk is exposed to the laser beam in the above-mentioned manner, the laser power with which the master optical disk is irradiated can be optimized in accordance with the kind (or length) of a pre-pit so that the width $W_1$ or $W_2$ of a pre-pit formed after development has a predetermined or desired constant value.

Since the formatter driver 17 is provided with the two signal sources 18 and 19 so as to allow the independent adjustment of the level of the sector mark signal and the level of the ID signal, the adjustment of the modulation efficiency is easy.

The subject matter of the present invention lies in that the power of radiation when a pre-pit longer than the diameter of a reproducing radiation spot is cut is made lower than the power of radiation when a pre-pit shorter than the diameter of the reproducing radiation spot is cut. Therefore, the present invention is not limited to the cutting apparatuses and the input signal levels of the optical modulator shown and explained in conjunction with the foregoing embodiments.

For example, though the foregoing embodiments have been explained in conjunction with the case where the Ar laser is used as a light source, the subject matter of the present invention is not limited to such a case. A light source emitting any radiation rays can be selected.

Also, though the foregoing embodiments have been explained in conjunction with the case where the formatter driver 17 is provided with the two signal sources 18 and 19, the present invention is not limited to such a case. It is of course that the formatter driver 17 can be controlled by a single signal source.

Further, though the foregoing embodiments have been explained in conjunction with the case where the sector mark is formed with a lower exposure intensity and the address pit and synchronizing pit are formed with a higher exposure intensity, the present invention is applicable irrespective of the kind of pre-pits to any case where pits longer than the diameter of a reproducing radiation spot and pits shorter than the diameter of the reproducing radiation spot coexist.

The driving manner for the prototype optical disk 11 upon cutting is not limited to the constant angular velocity rotation manner. The present invention is equally embodied even in the case of a constant linear velocity rotation manner if the output characteristic of radiation power is controlled to provide a constant value without being changed as shown in FIG. 14.

In case of the constant linear velocity rotation manner, the amount of radiated beam per unit area can be made constant by keeping the output radiation power, constant toward the radial direction of the disk and the same effects as the constant angular velocity rotation manner can be attained by decreasing the exposure intensity (level of the modulated signal) at the longer pits, as described above.

The present invention is applicable to an optical information recording disk of any size but is especially effective for a disk with a size equal to or smaller than 5.25 inches having small-sized pits. Also, the present invention is not limited to the kind of optical information recording disk and is applicable to any type of optical disk such as a video disk, a compact disk, an optical disk memory for computer, or the like.

As has been mentioned above, in an optical information recording medium according to the present invention, since a pre-pit longer than the diameter $\phi$ of a reproducing radiation spot is formed with a width $W_1$ satisfying a relation of $\phi/4 < W_1 < \phi/3$ and a pre-pit shorter than the diameter of the reproducing radiation spot is formed with a width $W_2$ equal to $\phi/3$, a reproduction signal having a high level and free of any waveform distortion can be obtained. As a result, an error upon reading of a signal can be reduced.

Also, in a method of fabrication of an optical information recording medium according to the present invention, since a laser power with which a master or prototype is irradiated is adjusted in accordance with the kinds (or lengths) of pre-pits, the width of each pre-pit can be made optimum. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical information recording medium comprising sector areas in which pre-pits each having a length longer than a diameter $\phi$ of a reproducing radiation spot and pre-pits each having a length shorter than the diameter of $\phi$ of the reproducing radiation spot coexist, wherein the pre-pits longer than the diameter $\phi$ of the reproducing radiation spot are sector mark pits and the pre-pits shorter than the diameter $\phi$ of the reproducing radiation spot are ID pits which include at least a synchronizing pit and an address pit and a width W of the pre-pit longer than the diameter of the reproducing radiation spot is formed having a value satisfying a relation of $\phi/4 < W < \phi/3$, wherein $\phi$ is the diameter of the reproducing radiation spot.

2. An optical information recording medium according to claim 1, wherein the pre-pits are formed so that they are superimposed on a pre-groove.

3. An optical information recording medium according to claim 1, wherein the pre-pits are formed between two streaks of adjacent pre-grooves.

4. An optical information recording medium according to claim 1, wherein said optical information recording medium has a disk-like outer shape, and the pre-pits and a pre-groove are formed circularly or spirally in a concentric relation with a center of said optical information recording medium.

5. An optical information recording medium according to claim 1, wherein said optical information recording medium has a card-like outer shape, and the pre-pits and a pre-groove are formed extending parallel to a side of said optical information recording medium.

6. A method of fabricating an optical information recording medium comprising:
intermittently irradiating a prototype with a radiation beam to cut a pre-pit train for each sector area, wherein a sector mark pit in each sector area is cut longer than a diameter $\phi$ of a reproducing radiation spot and ID pits in each area which include at least a synchronizing pit and an address pit are cut shorter than the diameter $\phi$ of the reproducing radiation spot, whereby power of the radiation beam when said sector mark pit for each sector area is cut is made lower than said power of the radiation beam when ID pits for each sector area are cut so that a width of said sector mark pit for each sector area is made equal to or narrower than that of said ID mark pits for each sector area.

7. A method according to claim 6, wherein a formatter driver capable of independently applying a signal corresponding to the pre-pit longer than the diameter of the reproducing radiation spot and a signal corresponding to the pre-pit shorter than the diameter of the reproducing radiation spot is connected to an optical modulator which subjects a radiation beam emanated from a light source to a signal modulation, whereby the radiation beam power when the pre-pit longer than the diameter of the reproducing radiation spot is cut and the radiation beam power when the pre-pit shorter than the diameter of the reproducing radiation spot is cut can be adjusted independently from each other.

8. A method according to claim 7, wherein the level of an input signal to the optical modulator is adjusted so that the modulation efficiency of the optical modulator becomes maximum when the pre-pit shorter than the diameter of the reproducing radiation spot is cut and it assumes 50% to 80% when the pre-pit longer than the diameter of the reproducing radiation spot is cut.

9. A method according to claim 6, wherein a formatter driver including an attenuator of 0.5 to 2 dB is connected to an optical modulator which subjects a radiation beam emanated from a light source to a signal modulation, a signal corresponding to the pre-pit longer than the diameter of the reproducing radiation spot is passed through the attenuator, and an output signal of the attenuator is composed with a signal corresponding to the pre-pit shorter than the diameter of the reproducing radiation spot so that the composite signal is applied to the optical modulator.

10. A method according to claim 6, wherein said prototype is configured into a disk-like shape and is rotationally driven at a constant angular velocity so that the radiation beam power for cutting the pre-pit train is adjusted in accordance with a distance from a center of rotation of said prototype to a radiation center of a radiation spot with which said prototype is irradiated.

11. A method according to claim 10, wherein the diameter of the prototype in which the pre-pit train is cut is not larger than 5.25 inches.

12. A method of fabricating an optical information recording medium which includes intermittently irradiating a prototype with a radiation beam to cut a pre-pit train for each sector including the combination of a plurality of pre-pits different in length from each other, comprising:

setting a power of the radiation beam when a pre-pit shorter than a diameter of a reproducing radiation spot among the plurality of pre-pits to be formed for each sector is cut to a predetermined optimum value;

setting a power of the radiation beam when a pre-pit longer than a diameter of the reproducing radiation spot is cut to a predetermined value smaller than the predetermined optimum value of the radiation beam power when the pre-pit shorter than the diameter of the reproducing radiation spot is cut; and performing the cutting of the pre-pit train while combining the radiation beam power having the predetermined optimum value when the pre-pit shorter than the diameter of the reproducing radiation spot is cut with the radiation beam power having the predetermined smaller value when the pre-pit longer than the diameter of the reproducing radiation spot is cut.

13. A method according to claim 12, wherein the setting of the radiation beam power when the pre-pit shorter than the diameter of the reproducing radiation beam is cut is made in such a manner that a signal from a predetermined signal source is adjusted to provide said predetermined optimum value, thereby producing a pilot signal for the shorter pre-pit, and the setting of the radiation beam power when the pre-pit longer than the diameter of the reproducing radiation spot is cut is made in such a manner that a signal from another predetermined signal source is adjusted to provide said predetermined smaller value, thereby producing a pilot signal for the longer pre-pit, the pilot signal for the shorter pre-pit and the pilot signal for the longer pre-pit being combined with each other at a predetermined timing to produce a modulating signal, whereby a radiation beam from a predetermined radiation source is signal-modulated by said modulating signal to cut the pre-pit shorter than the diameter of the reproducing radiation spot and the pre-pit longer than the diameter of the reproducing radiation spot.

14. A method according to claim 13, wherein said predetermined timing at which the pilot signal for the longer pre-pit and the pilot signal for the shorter pre-pit are combined with each other is a frequency at which the shorter and longer pre-pits are to be formed in each sector.

15. A method according to claim 12, wherein when said predetermined optimum value of the radiation beam power when the shorter pre-pit is cut is 100, said predetermined smaller value of the radiation beam power when the longer pre-pit is cut is 50 to 80.

16. A method according to claim 13, wherein in producing said modulating signal, said signal from said predetermined signal source is attenuated by 0.5 to 2 dB at least upon setting of the radiation beam power when the pre-pit longer than the diameter of the reproducing radiation spot is cut.

17. A method according to claim 12, wherein the pre-pit shorter than the diameter of the reproducing radiation spot is cut at a position where an ID pit is to be formed, and the pre-pit longer than the diameter of the reproducing radiation spot is formed at a position where a sector mark pit is to be formed.

18. A method according to claim 12, wherein said prototype has a disk-like shape, said disk-like prototype being rotationally driven at a constant angular velocity, and an output of said radiation source for cutting the pre-pit train is increased at a predetermined proportion in accordance with a radial distance from a center of rotation of said disk-like prototype to a center of a radiation beam spot with which said prototype is irradiated.

* * * * *